US012624884B2

(12) United States Patent
Paupardin

(10) Patent No.: US 12,624,884 B2
(45) Date of Patent: May 12, 2026

(54) CELL FOR STORING A SET OF PRODUCTS IN WHICH AN AIR FLOW THROUGH THE SET OF PRODUCTS IS IMPLEMENTED AND WHICH IS EQUIPPED WITH AN INFLATABLE SEALING DEVICE

(71) Applicant: FROMFROID, Isques (FR)

(72) Inventor: Benoit Paupardin, Isques (FR)

(73) Assignee: FROMFROID, Isques (FR)

( * ) Notice: Subject to any disclaimer, the term of this patent is extended or adjusted under 35 U.S.C. 154(b) by 1021 days.

(21) Appl. No.: 17/763,701

(22) PCT Filed: Sep. 15, 2020

(86) PCT No.: PCT/EP2020/075717
§ 371 (c)(1),
(2) Date: Mar. 25, 2022

(87) PCT Pub. No.: WO2021/058326
PCT Pub. Date: Apr. 1, 2021

(65) Prior Publication Data
US 2022/0341645 A1 Oct. 27, 2022

(30) Foreign Application Priority Data
Sep. 27, 2019 (FR) ...................................... 1910751

(51) Int. Cl.
*F25D 17/00* (2006.01)
*A23B 2/708* (2025.01)
(Continued)

(52) U.S. Cl.
CPC ............ *F25D 17/005* (2013.01); *A23B 2/708* (2025.01); *A23B 11/145* (2025.01);
(Continued)

(58) Field of Classification Search
CPC ...... F25D 17/005; F25D 17/045; F25D 17/06; F25D 23/069; F25D 11/003;
(Continued)

(56) References Cited

U.S. PATENT DOCUMENTS

| 5,778,557 A | 7/1998 | Leavens |
| 6,340,043 B1 * | 1/2002 | Paupardin .............. B65D 81/18 |
| | | 156/580 |
| 2011/0244097 A1 | 10/2011 | North et al. |

FOREIGN PATENT DOCUMENTS

| CN | 104879977 A | * 9/2015 | .............. F25D 11/00 |
| CN | 208108539 U | 11/2018 | |

(Continued)

OTHER PUBLICATIONS

Int'l Search Report for PCT/EP2020/075717, dated Dec. 15, 2020.

(Continued)

*Primary Examiner* — Steven B Mcallister
*Assistant Examiner* — Michael James Giordano
(74) *Attorney, Agent, or Firm* — David D. Brush; Westman, Champlin & Koehler, P.A.

(57) ABSTRACT

The storage cell includes ventilation means suitable for creating a rear-to-front air flow or a front-to-rear air flow, an inflatable sealing device, and inflation means which allow the inflatable sealing device to be inflated. The inflatable sealing device includes an upper inflatable sealing element and at least one side inflatable sealing element which directly or indirectly allow, in the inflated state, a seal between the upper wall of the cell and at least one part of the top face of a set of products positioned in the cell and a seal between at least one side wall of the cell and at least one part of one of the side faces of this set of products. The upper inflatable sealing element and the side inflatable sealing element delimit a single inflatable chamber, and the inflation means allow the upper inflatable sealing element and the (Continued)

side inflatable sealing element to be inflated by blowing air into this single inflatable chamber.

22 Claims, 8 Drawing Sheets

(51) Int. Cl.

| | | |
|---|---|---|
| *A23B 11/145* | (2025.01) | |
| *F25D 17/04* | (2006.01) | |
| *F25D 23/06* | (2006.01) | |

(52) U.S. Cl.
CPC ......... *F25D 17/045* (2013.01); *F25D 23/069* (2013.01); *F25D 2317/063* (2013.01)

(58) Field of Classification Search
CPC ....... F25D 2317/063; F25D 2317/0684; B65D 88/745; B65D 2590/00; B60P 3/20; B60P 7/065

See application file for complete search history.

(56) References Cited

FOREIGN PATENT DOCUMENTS

| | | | | | |
|---|---|---|---|---|---|
| FR | 2767784 | A1 | | 3/1999 | |
| FR | 2871222 | A1 | | 12/2005 | |
| FR | 2938242 | A1 | | 5/2010 | |
| WO | 9911141 | A1 | | 3/1999 | |
| WO | WO-2007129280 | A1 | * | 11/2007 | ........... B65D 90/004 |
| WO | WO-2018219662 | A1 | * | 12/2018 | ............ B64U 30/20 |
| WO | 2019174985 | A1 | | 9/2019 | |

OTHER PUBLICATIONS

English translation of the Written Opinion of the International Searching Authority dated Dec. 15, 2020 for corresponding International Application No. PCT/EP2020/075717, filed Sep. 15, 2020.
Chinese Office Action dated Nov. 13, 2023, for corresponding Chinese Application No. 202080064282.5.

* cited by examiner

CELL FOR STORING A SET OF PRODUCTS IN WHICH AN AIR FLOW THROUGH THE SET OF PRODUCTS IS IMPLEMENTED AND WHICH IS EQUIPPED WITH AN INFLATABLE SEALING DEVICE

TECHNICAL FIELD

The present invention relates to the storage of a set of products in a storage cell in which an air flow through the set of products is created, in particular, but not exclusively, a reversible air flow, said storage cell being equipped with an improved inflatable sealing device. In particular, it can be used for the temporary storage of a set of food products, for example, but non-exhaustively, dairy, or non-dairy food products, such as fermented yogurts, farm-made yogurts, other yogurt products, dessert creams, cheeses, fruits, vegetables, ready meals, yeast, compotes, fruit juices, non-dairy desserts, and butter, with modification or maintenance of the temperature and/or moisture content of the products by means of said air flow.

PRIOR ART

It is known in the agri-food sector to use storage cells, such as those described in international patent application WO99/11141, in French patent application FR2871222, in international patent application WO2019/174985, or in French patent application FR2938242, for the temporary storage of a set of products, in particular food products, for example dairy or non-dairy products such as yogurts, yogurt products, cheeses, etc., packaged and positioned on a storage support, in particular of the pallet, rack or trolley type, with the creation of a flow of conditioned air through this set of products in order to adjust the temperature and/or moisture content of the products.

This air flow may be, for example, a flow of cold air having a controlled temperature and, where appropriate, a controlled relative humidity level, so as to allow cooling or low-temperature storage of the products, such as fermented yogurts, other yogurt products, and cheeses, where appropriate with controlled product moisture content.

This air flow may also be a flow of hot air having a controlled temperature and, where appropriate, a controlled relative humidity level, so as to allow heating of the products, where appropriate with controlled product moisture content. This type of hot air flow is, for example, used to store fermentable products, such as farm-made yogurts, by heating them so that they ferment during their time in the cell with a controlled fermentation period.

This air flow may also be an air flow at the temperature of the products, where appropriate with a controlled relative humidity level, so as to allow the products to be maintained at a temperature for the duration of storage in the cell, where appropriate with a controlled product moisture content.

In international patent applications WO99/11141 and WO2019/174985 and in French patent application FR2871222, the air flow is created by means of at least one fan which is positioned at the rear of the storage cell and which, in operation, makes it possible to blow an air flow from the rear to the front of the cell. In order to canalize and force the air flow through the set of products positioned in the storage cell, seals on the top and on both sides of the set of products are created, respectively, by means of three sealing tarpaulins which inflate under the action of the air pressures in the storage cell when the fan is operating and which, upon inflation, come to press against the set of products so as to create a seal on the top and on both sides of the set of products. Due to the implementation of this seal, an air flow is thus forced to circulate from the rear to the front of the cell through the set of products.

In this type of storage cell, the inflation of the upper sealing tarpaulin and of each side sealing tarpaulin can only be brought about in the presence of the set of products positioned in the cell. The presence of this set of products in the cell makes it possible to bring about a pressure drop sufficient to divert part of the air blown by the fan toward the space formed between the upper sealing tarpaulin and the upper wall of the cell and part of the air blown by the fan toward the space formed between each side sealing tarpaulin and the corresponding side wall of the cell, the remaining part of the air blown by the rear fan passing through the set of products. If this fan is operated at the rear of the storage cell when the set of products is not in the cell (i.e. when the storage cell is empty), the air flow blown by the fan does not inflate the upper and side sealing tarpaulins. When the set of products is not in the cell, including when the fan is operating and blowing a rear-to-front air flow into the cell, the upper sealing tarpaulin and each side sealing tarpaulin remain deflated.

In addition, in this type of storage cell, even when a set of products is positioned in the cell and the fan is blowing a rear-to-front air flow, the air entering between the upper sealing tarpaulin and the upper wall only inflates this upper sealing tarpaulin with respect to the upper wall due to the presence of the side tarpaulins which extend up to the upper wall of the cell (cf. FIG. 8), and do not inflate either side sealing tarpaulin with respect to the corresponding side wall, and vice versa.

In international patent application WO2019/174985, the aforementioned storage cell having upper and side sealing tarpaulins has been improved by adding an auxiliary sealing device, which generally allows the aforementioned sealing tarpaulins to be kept in contact with the set of products, regardless of the direction of circulation of the air flow in the cell, which advantageously allows in particular a reversal of the direction of circulation of the air flow in the cell. More particularly, in a particular variant, this auxiliary sealing device is an inflatable sealing device which may include a plurality of inflatable sealing beads which are distinct and separate, namely, for example, an upper inflatable sealing bead and at least two side inflatable sealing beads.

The storage cells described in international patent application WO99/11141 and in French patent application FR2871222 make it possible, most of the time, to obtain a very good seal and to canalize the rear-to-front air flow through a set of products positioned in the storage cell in an efficient manner.

However, in the event of improper positioning of a side sealing tarpaulin relative to the upper sealing tarpaulin, there may be a risk of a leak in the region of the corresponding upper corner of the cell.

In an attempt to overcome this drawback, French patent application FR2938242 proposes implementing, as sealing means, an upper airbag and side airbags which allow direct or indirect sealing of a set of products positioned in the cell to be achieved on the top face and on the side faces in the inflated state. The sealing airbags are distinct and separate, and each sealing airbag is connected to an air blowing means via a sleeve. In the solution described in this publication, the sealing airbags are inflated in accordance with a specific inflation sequence, during which the upper sealing airbag must inflate before the side sealing bags. The implementation of the aforementioned specific inflation sequence complicates the inflation of the sealing airbags and makes it more complex to produce the inflation means.

AIM OF THE INVENTION

The main aim of the present invention is to provide a storage cell comprising a new sealing device which has been improved, and which in particular does not require a specific inflation sequence to be implemented.

SUMMARY OF THE INVENTION

The invention also relates to a storage cell intended for the storage of at least one set of products, in particular a set of products that is arranged on at least one storage support, more particularly on at least one storage support of the pallet, trolley, or rack type.

In a manner that is known, in particular from international patent application WO2019/174985, said cell comprises two side walls which face each other and are spaced apart from each other, and an upper wall which delimits, with the two side walls, a housing for the set of products; said housing comprises, on the front face, an opening for the introduction and/or removal of the set of products; said cell also comprises ventilation means suitable for creating a rear-to-front air flow (A) circulating in the housing from the rear to the front of the housing or for creating a front-to-rear air flow (B) circulating in the housing from the front to the rear of the housing; said cell comprises an inflatable sealing device and inflation means which allow the inflatable sealing device to be inflated; the inflatable sealing device comprises an upper inflatable sealing element and at least one side inflatable sealing element which directly or indirectly allow, in the inflated state, a sealing between the upper wall of the cell and at least one part of the top face of a set of products positioned in the cell and a sealing between at least one side wall of the cell and at least one part of one of the side faces of a set of products positioned in the cell.

Characteristically, according to the invention, the upper inflatable sealing element and the side inflatable sealing element delimit a single inflatable chamber, and the inflation means allow the upper inflatable sealing element and the side inflatable sealing element to be inflated by blowing air into this single inflatable chamber. In the invention, in contrast to the upper and side sealing tarpaulins of storage cells from e.g. the aforementioned publications WO99/11141 and WO2019/174985, the upper inflatable sealing element and the side inflatable sealing element delimit said single inflatable chamber regardless of the presence of a set of products in the storage cell, and the inflation means allow the upper inflatable sealing element and the side inflatable sealing element to be inflated by blowing air into this single inflatable chamber regardless of the presence of a set of products in the storage cell.

In other words, in the invention, the upper inflatable sealing element and the side inflatable sealing element delimit said single inflatable chamber even in the absence of a set of products in the storage cell, i.e. even when the cell is empty, and the inflation means allow the upper inflatable sealing element and the side inflatable sealing element to be inflated by blowing air into this single inflatable chamber even in the absence of a set of products in the storage cell, i.e. even when the cell is empty.

In the most general scope of the invention, an "inflatable sealing element" ("upper inflatable sealing element" and "side inflatable sealing element") can be used to provide a so-called "direct" seal by being adapted to be, in the inflated state, directly in contact with a set of products positioned in the cell, or to ensure a so-called "indirect" seal by being adapted to be, in the inflated state, in contact with a set of products positioned in the cell via another sealing element, such as a flexible sealing skirt.

More particularly, and optionally, the storage cell according to the invention can comprise the following optional features, either alone or in combination with one another:

the inflatable sealing device comprises two side inflatable sealing elements which, together with the upper inflatable sealing element, define said single inflatable chamber and which, in the inflated state, make it possible to provide a seal directly or indirectly between each side wall of the cell and at least one part of each side face of a set of products positioned in the cell.

the inflatable chamber comprises at least one air inlet, preferably a single air inlet, so that the air blown in via this air inlet allows the upper inflatable sealing element and the one or more side inflatable sealing elements to be inflated.

this air inlet is formed in the upper inflatable sealing element or in a side inflatable sealing element.

said air inlet is formed in the upper inflatable sealing element and is preferably positioned substantially centrally with respect to the upper inflatable sealing element.

the inflation means comprise at least one fan or air compressor and said single inflatable chamber comprises at least one air inlet, preferably a single air inlet, which is connected to the fan or to the air compressor such that the air blown into said single inflatable chamber through this air inlet, by means of the fan or the air compressor, allows the upper inflatable sealing element and the side inflatable sealing element(s) to be inflated.

the fan or air compressor of the inflation means is distinct from the ventilation means of the cell.

said fan or air compressor communicates with said single inflatable chamber via an air inlet formed in the upper inflatable sealing element and is preferably positioned substantially centrally with respect to the upper inflatable sealing element.

said fan or said air compressor makes it possible to draw in air outside the storage cell and blow it into the single inflatable chamber by passing this air through one of the walls of the cell, preferably through the upper wall of the cell.

said fan or said air compressor is positioned through one of the walls of the cell, preferably through the upper wall of the cell, and allows air to be blown directly into the single inflatable chamber.

said fan or air compressor is integrated in the upper inflatable sealing element or in a side inflatable sealing element of the inflatable sealing device and is preferably integrated in the upper inflatable sealing element.

the upper inflatable sealing element and each side inflatable sealing element are distinct parts which are or can be detachably or permanently joined to each other.

said inflatable sealing device is formed in one piece.

said inflatable sealing device consists of one or more inflatable sealing ducts, in particular of one or more flexible sealing ducts, more particularly of one or more textile ducts.

the upper inflatable sealing element comprises an upper inflatable duct which is fixed to the upper wall of the cell, and each side inflatable sealing element has a side inflatable duct which is fixed to one of the side walls of the cell and which communicates directly and in a sealed manner with the upper inflatable duct so as to form said single inflatable chamber.

the upper inflatable sealing element is fixed to the upper wall of the cell and each side inflatable sealing element is fixed to one of the side walls of the cell, such that said inflatable sealing elements delimit, together with said walls of the cell, said single inflatable chamber.

the cell comprises an upper flexible sealing skirt which is fixed to the upper wall of the cell such that the upper inflatable sealing element of the inflatable sealing device is positioned between this upper wall and this upper flexible sealing skirt, said upper flexible sealing skirt being suitable for inflating with respect to the upper wall of the cell and toward the interior of the housing under the effect of an air pressure which is generated in the housing, in the presence of a set of products in the storage cell, by means of said air flow created by the ventilation means of the cell, optionally with the assistance of the upper inflatable sealing element during inflation or in the inflated state.

the cell comprises at least one side flexible sealing skirt which is fixed to one of the side walls of the inflatable cell such that a side inflatable sealing element of the inflatable sealing device is positioned between this side wall and the side flexible sealing skirt, the side flexible sealing skirt being suitable for inflating with respect to said side wall of the cell and toward the interior of the housing under the effect of an air pressure which is generated in the housing, in the presence of a set of products in the storage cell, by means of said air flow (A) created by the ventilation means of the cell, optionally with the assistance of the side inflatable sealing element during inflation or in the inflated state.

the ventilation means are suitable for creating, non-simultaneously and preferably one after the other, a rear-to-front air flow (A) that circulates from the rear to the front of the housing and a front-to-rear air flow (B) that circulates from the front to the rear of the housing, or vice versa.

the storage cell comprises control means which are suitable for automatically controlling the ventilation means and the inflation means of the inflatable sealing device such that, during at least one operating phase of the storage cell, the ventilation means generate an air flow (A) in the housing which, in the presence of a set of products in the storage cell, allows each flexible sealing skirt to be inflated, the inflatable sealing device optionally, but not necessarily, being inflated during this operating phase.

the storage cell comprises control means which are suitable for automatically controlling the ventilation means and the inflation means of the inflatable sealing device such that, during at least one operating phase of the cell, the inflatable sealing device is inflated and the ventilation means generate an air flow (B) in the housing which does not allow the flexible sealing skirt or skirts to be inflated.

The invention also relates to a use of the aforementioned storage cell for adjusting the temperature and/or moisture content of at least one set of products, in particular of a set of products arranged on at least one storage support, more particularly on at least one storage support of the pallet, trolley, or rack type.

The invention also relates to a method for storing, more particularly for adjusting the temperature and/or moisture content of at least one set of products, in particular of a set of products arranged on at least one storage support, more particularly on at least one storage support of the pallet, trolley, or rack type, during which said set of products is positioned in the housing of the aforementioned storage cell, and the inflatable sealing device is then inflated so as to directly or indirectly create a seal between the upper wall of the cell and at least one part of the top face of the set of products positioned in the cell and a seal between at least one of the side walls of the cell and at least one part of one of the side faces of the set of products positioned in the cell, preferably between the two side walls of the cell and at least one part of the two opposite side faces of the set of products, and a rear-to-front air flow (A) that circulates through the set of products from the rear to the front of the storage cell or a front-to-rear air flow (B) that circulates through the set of products from the front to the rear of the storage cell is created.

More particularly, during this method, the temperature and/or humidity of the air flow is preferably adjusted automatically.

More particularly, the products can be non-food products or food products, more particularly food products selected from the following non-exhaustive list: dairy food products, non-dairy food products, fermented yogurts, farm-made yogurts, other yogurt products, dessert creams, cheeses, fruits, vegetables, ready meals, yeast, compotes, fruit juices, dairy or non-dairy desserts, and butter.

BRIEF DESCRIPTION OF THE DRAWINGS

The features and advantages of the invention will become clearer on reading the following detailed description of a number of embodiments of the invention, which detailed description is as a non-limiting and non-exhaustive example of the invention and makes reference to the accompanying drawings, in which.

DETAILED DESCRIPTION

Figure 1:
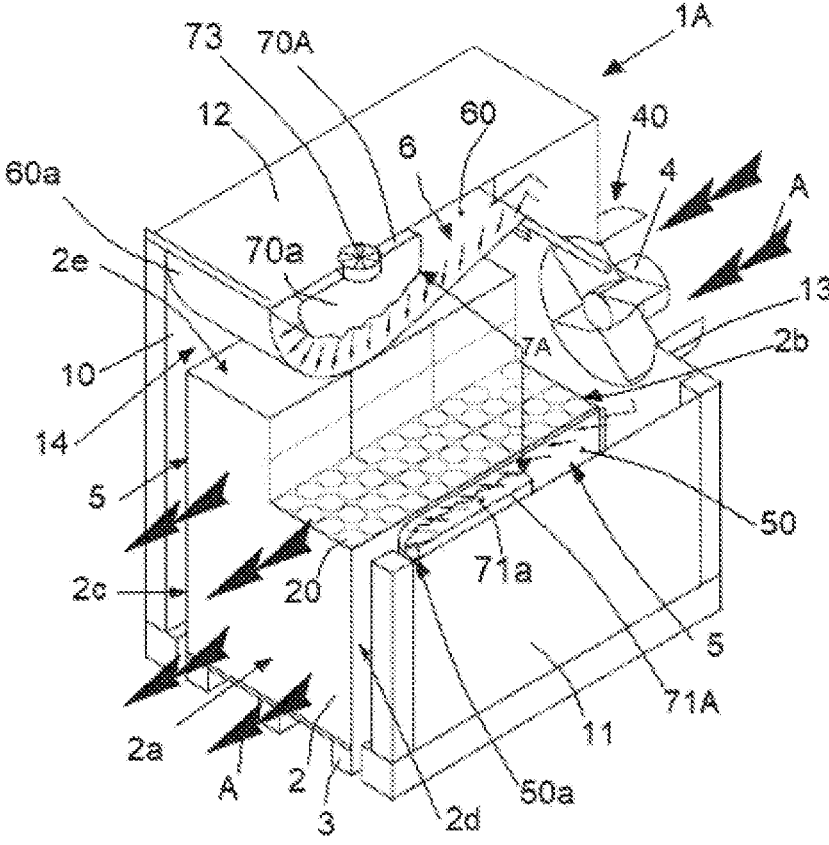
FIG. 1 is an isometric overall view of a first embodiment of a storage cell according to the invention in which a set of products is positioned on a pallet and a rear-to-front air flow that passes through the set of products on the pallet is circulated, and in which the specific inflatable sealing device of the invention is deflated.

FIG. 1 shows a first particular embodiment of a storage cell 1A according to the invention in which a set 2 of products 20 packaged in packaging and arranged on a support 3 of the pallet type is positioned.

This storage cell 1A can be used for the storage of any type of product 20, more particularly, but not exclusively, food products (dairy or non-dairy) such as fermented yogurts, farm-made yogurts, other yogurt products, dessert creams, cheeses, fruits, vegetables, ready meals, yeast, compotes, fruit juices, dairy or non-dairy desserts, butter, etc.

This storage cell 1A can also be used to store products 20 that are non-food products.

The storage cell 1 can be used to adjust the temperature, in particular to cool the products 20 and/or heat the products 20 and/or maintain the temperature of the products 20 and/or to adjust the moisture content of the products 20.

This set 2 of products 20 can be handled, for example by means of a fork-lift truck, in order to be installed in the storage cell 1 or removed from the storage cell 1.

In the context of the invention, the set 2 of products 20 can also be arranged on at least one storage support such as a trolley or rack and is not necessarily a set of products supported by a pallet 3.

In FIG. 1, this set 2 of products 20 is shown schematically and comprises a front face 2a, a rear face 2b, two opposite side faces 2c, 2d and a top face 2e, it being understood that at least the front faces 2a and rear faces 2b of this set 2 of products 20 can allow an air flow A (FIG. 1) or B (FIG. 2) circulating through the set 2 of products 20 to pass through.

This storage cell 1 comprises two side walls 10 and 11 that are opposite each other and spaced apart from each other and an upper wall 12 that connects the two side walls 10, 11 and delimits, together with the two side walls 10, 11, a housing 14, and a rear wall 13. This housing 14 comprises, on the front face, an opening that in particular allows the introduction of the set 2 of products 20 into the storage cell and/or the removal of the set 2 of products 20 from the storage cell.

In FIG. 1, the side wall 11 and the upper wall 12 are cut so as to allow a better view of the interior of the cell; the upper part of the set 2 of products 20 substantially in the form of a rectangular parallelepiped is also cut so as to allow a view of the products 20.

The storage cell has ventilation means 4 at the rear face in the form of at least one fan 40, which, during operation, creates a rear-to-front air flow A (FIG. 1) that circulates from the rear to the front of the housing 14 or creates, non-simultaneously with the rear-to-front air flow A, a front-to-rear air flow B (FIG. 3) that circulates from the front to the rear of the housing 14.

Preferably, the ventilation means 4 also comprise means (not shown) which allow the temperature and/or humidity of the rear-to-front air flow A and, if applicable, the front-to-rear air flow B to be adjusted before they pass through the cell.

This temperature and/or the humidity level of the rear-to-front air flow A and, if applicable, the front-to-rear air flow B, will depend on the nature of the products 20 stored in the cell 1 and the action (in particular cooling or heating or maintaining the temperature of the products 20) to be carried out on these products 20 by means of the rear-to-front air flow A and, if applicable, the front-to-rear air flow B.

The storage cell 1A has main three sealing devices 5, 6, i.e. two side sealing devices 5 (only the right-hand side sealing device 5 is visible in FIG. 1) and an upper sealing device 6, the two side sealing devices 5 being identical.

These three main sealing devices 5, 6 are associated with an auxiliary inflatable sealing device 7A which is specific to the invention.

Main Sealing Devices 5 and 6

The main sealing devices 5, 6 are known and have already been described in particular in international patent application WO2019/174985, to which reference can be made for a more detailed description.

In particular, each main sealing device 5, 6 comprises a sealing skirt 50, 60, which is flexible and impermeable to air.

Each flexible sealing skirt 50, 60 consists, for example, of a single-layer or multi-layer sealing tarpaulin impermeable to air or of a coated canvas impermeable to air.

The flexible side sealing skirt 50 of each side sealing device 5 is rigidly connected to the corresponding side wall 10 or 11, more particularly by being fixed at its front edge 50a to the front part of the inner face of the corresponding side wall 10 or 11 near the opening at the front face of the housing 14.

The upper flexible sealing skirt 60 of the upper sealing device 6 is rigidly connected to the upper wall 12, more particularly by being fixed at its front edge 60a to the inner face of the upper wall 12.

Each sealing skirt 50, 60 is suitable (FIG. 1), under the effect of an air pressure generated in the cell by the rear-to-front air flow A, in the presence of a set 2 of products 20, to inflate with respect to the inner face of the corresponding wall 10, 11, or 12 of the cell and toward the interior of the housing 14.

Auxiliary Inflatable Sealing Device 7A

Figure 4:
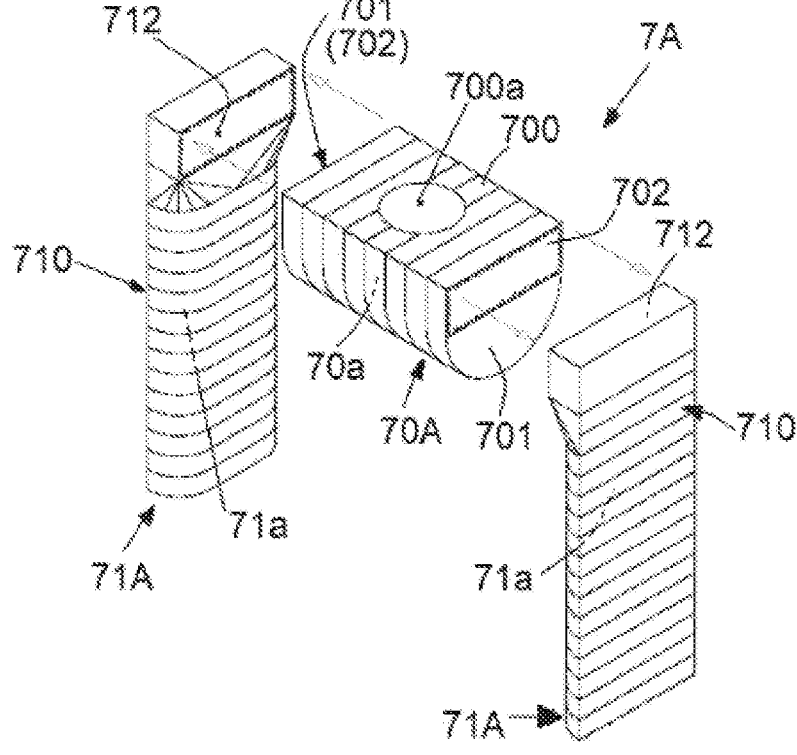
FIG. 4 is an exploded overall view of a first embodiment of an inflatable sealing device according to the invention which corresponds to that of the storage cell from FIGS. 1 to 3.
Figure 5:
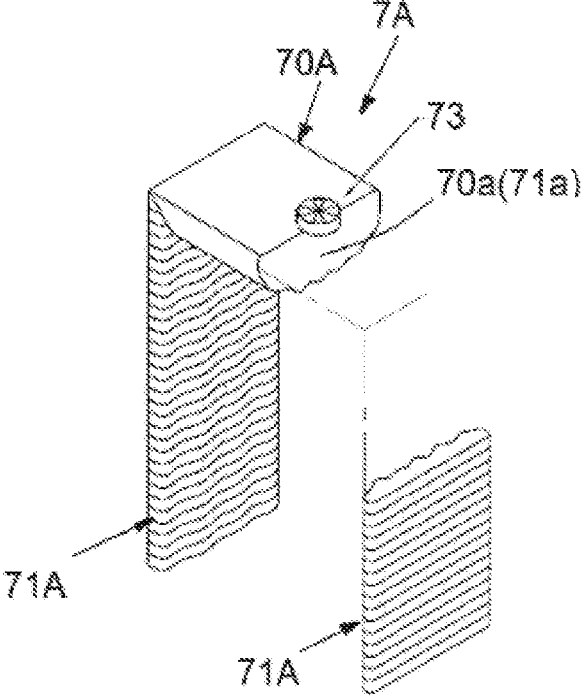
FIG. 5 is an overall view of the inflatable sealing device from FIG. 4 in the deflated state.
Figure 6:
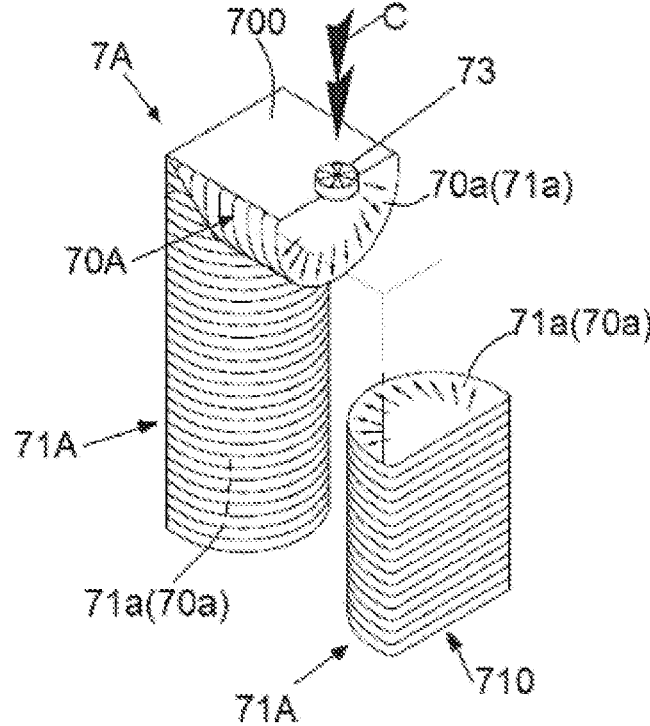
FIG. 6 is an overall view of the inflatable sealing device of FIG. 4 in the inflated state.

FIGS. 4 to 6 show a first particular embodiment of this auxiliary inflatable sealing device 7A.

With reference to FIG. 4, the inflatable sealing device 7A comprises three inflatable sealing ducts, for example fully or partially flexible sealing ducts, of the textile duct type, namely an upper inflatable sealing duct 70A and two side inflatable sealing ducts 71A.

The impermeable material or materials used to manufacture the inflatable sealing ducts 70A and 71A are irrelevant to the invention. The invention is not limited to the specific structure of the inflatable sealing ducts 70A and 71A of the appended drawings either and is in particular not limited to the specific geometries of the cross sections of the inflatable sealing ducts 70A and 71A of the appended drawings.

With reference to FIG. 5, these inflatable sealing ducts 70A, 71A can be detachably joined together so as to form a one-piece, U-shaped inflatable arch, the base of the U being formed by the upper inflatable sealing duct 70A.

The upper inflatable sealing duct 70A defines an internal volume 70a which can be filled with pressurized air.

The upper wall 700 of the upper sealing duct 70A is used to fix the duct 70A to the lower face of the upper wall 12 of the storage cell 1A and can therefore be either more or less flexible or more or less rigid.

The upper wall 700 of the upper sealing duct 70A comprises a single air inlet in the form of a through-hole 700a (FIG. 4) which functions as an air admission opening for the inflation of the entire sealing device 7A and as an air discharge opening for deflating the entire sealing device 7A.

This air admission/discharge hole 700a is preferably positioned in the center of the upper sealing duct 70A so as to allow, during inflation or deflation, a symmetrical distribution of air toward the two side sealing ducts 71A.

In another variant, it is possible for the air inlet formed by the air admission/discharge hole 700*a* not to be centered and/or to be formed in one of the two side sealing ducts 71A.

An air passage opening 702 is formed in each flexible end wall 701 of the duct 70A.

Each side inflatable sealing duct 71A defines an internal volume 71*a* (FIG. 4) which can be filled with pressurized air.

The wall 710 of the side sealing duct 71A is used to fix the duct 71A to the inner face of one of the side walls 10 or 11 of the cell and can therefore be either more or less flexible or more or less. rigid.

Each side sealing duct 71A has, in the upper part, an air passage opening 712.

When the upper duct 70A and the side ducts 71A are joined (FIG. 5), each side inflatable sealing duct 71A is positioned at one end of the upper sealing duct 70A such that its air passage opening 712 coincides with a corresponding air passage opening 702 of the upper inflatable sealing duct 70A. Each side inflatable sealing duct 71*a* is also detachably fixed to the upper inflatable duct 70A, for example by means of zipper systems 72 (FIG. 4) or the like.

In the particular example shown, each zipper system 72 or the like surrounds the air passage openings 702/712 over their entire periphery, such that the internal volume 70*a* of the upper duct 70A communicates directly and in a sealed manner with the internal volume 71*a* of each side inflatable sealing duct 71A via the air passage openings 702/712.

As a result, the upper inflatable sealing element, in this particular example formed by the upper inflatable duct 70A, and each side inflatable sealing element, in this particular example formed by the side inflatable duct 71A, delimit, independently of the presence or absence of a set 2 of products 20 in the cell, a single inflatable sealed chamber which is formed by said internal volumes 70*a* and 71*a* of the upper duct 70A and of the side ducts 71A and into which pressurized air (FIG. 6/arrow C) can be blown in via the air admission hole 700*a* in order to inflate (FIG. 6) the upper duct 70A and each side duct 71A.

In the embodiment shown in FIG. 4, each air passage opening 702/712 is rectangular; however, this rectangular shape is not limiting to the invention, and the air passage openings 702/712 may have a different geometry.

With reference to FIGS. 5 and 6, the sealing device 7A comprises, for the inflation thereof, a fan 73, for example of the centrifugal type, which is distinct from the ventilation means 4 of the cell and which generally communicates with said single inflatable chamber 70*a*/71*a* by being sealingly connected to the air admission opening 700*a* to allow inflation of the inflatable sealing device 7A.

More particularly, in the example in FIGS. 5 and 6, this fan 73 is preferably rigidly connected to the inflatable sealing device 7A by being integrated in the upper duct 70A at this air admission opening 700*a* so as to blow air into the single inflatable chamber 70*a*/71*a* during operation via this air admission opening 700*a* directly at the outlet of the fan 73.

In another embodiment, the fan 73 could be replaced by an air compressor.

In another embodiment, the fan or air compressor 73 could be offset with respect to the air admission opening 700*a* and sealingly connected to the air admission opening 700*a* by a flexible or rigid duct.

In another embodiment, the single inflatable chamber 70*a*/71*a* could include a plurality of air admissions 700*a*, each sealingly connected to the fan or air compressor 73.

The invention is not limited to an inflatable sealing device in which the upper sealing duct 70A can be detachably joined to each side sealing duct 71A. In other embodiments, the upper sealing duct 70A can be permanently fixed to each side sealing duct 71A, for example by means of a seam and/or a weld and/or a glue line surrounding the air passage openings 702/712, the important thing being that the upper sealing duct 70A communicates in a sealed manner with each side sealing duct 71A.

The invention is also not limited to an inflatable sealing device formed by a monolithic assembly of a plurality of parts (ducts 70A and 71A) but may in another variant be formed in a single piece that forms the ducts 70*a* and 71A.

Figure 2:
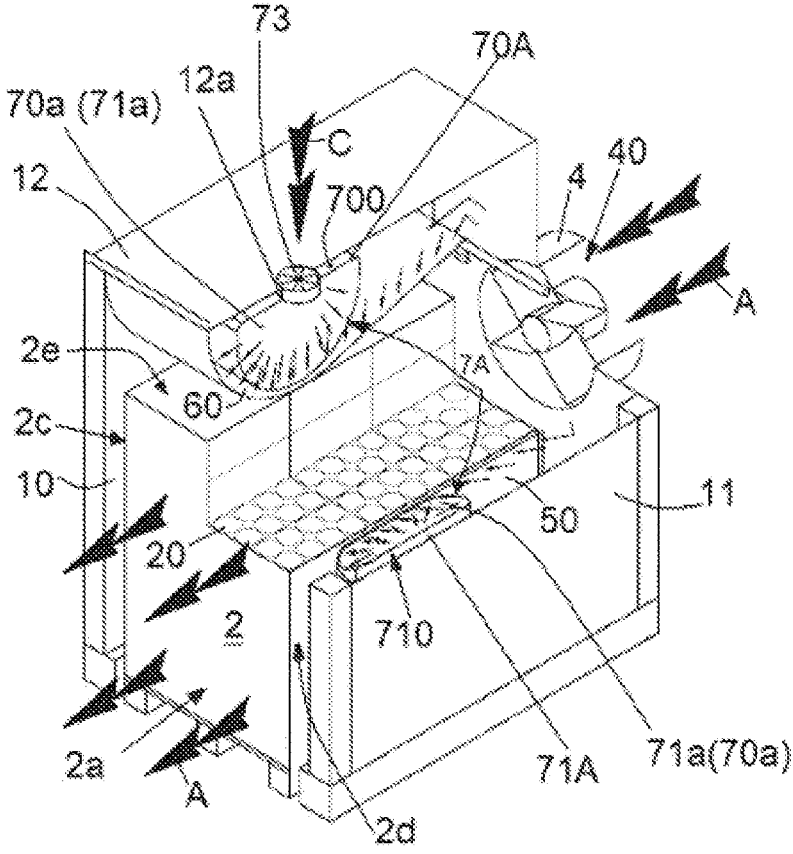
FIG. 2 shows the cell from FIG. 1 when the specific inflatable sealing device of the invention has been inflated.

With particular reference to FIGS. 1 and 2, the auxiliary inflatable sealing device 7A described above is mounted in the cell 1A:

by fixing the upper inflatable sealing duct 70A to the inner face of the upper wall 12 of the cell between this wall 12 and the upper sealing tarpaulin 60, and by fixing each side inflatable sealing duct 71A to the inner face of the corresponding side wall 10 or 11 of the cell 1A between this side wall 10 or 11 and the corresponding side sealing tarpaulin 50.

More particularly, the aforementioned fan 73 is positioned through the upper wall 12 of the cell and makes it possible to draw in air outside the storage cell 1A and blow it directly into the single inflatable chamber 70*a*/71*a* by passing this air (FIG. 2/arrow C) through this upper wall 12 of the cell.

Examples of Storage Cell Operation

The storage cell 1 comprises electronic automatic control means which are suitable for automatically controlling the ventilation means 4 and the fan 73. These electronic automatic control means of the cell are for example implemented in the form of a programmable controller which is suitable for automatically executing a program stored in memory.

Particular operating phases that can be controlled automatically by these electronic automatic control means of the cell will now be detailed.

In the particular operating phase of FIG. 1, the electronic control means of the cell automatically control the fan 40 of the ventilation means 4 such that a rear-to-front air flow A is circulated in the cell from the rear to the front of the cell.

In a manner known per se, in the presence of a set 2 of products 20 in the cell, the air pressure which is generated by this rear-to-front flow A inside the storage cell between each skirt 50, 60 and the corresponding wall 10, 11, or 12 allows the sealing skirts 50, 60 to be inflated in their sealing configuration with respect to their respective walls 10, 11, and 12 such that, with reference to FIG. 1:

the upper sealing skirt 60 inflates toward the interior of the cell by partially pressing against a part of the upper face 2*e* of the set 2 of products 20, which preferably covers the entire width of the set 2 of products 20 so as to ensure a seal between the upper wall 12 and the upper face 2*e* of the set 2 of products 20.

each side skirt 50 inflates toward the inside of the cell by pressing, preferably over the entire height of the assembly 2 of products 20, against the corresponding side face 2*c* or 2*d* of the assembly 2 of products 20 so as to ensure a seal between each side wall 10, 11 and the corresponding side face 2*c*, 2*d* of the set 2 of products 20.

A seal is thus produced on three sides (upper face 2*e* and side faces 2*c* and 2*d*) of the set 2 of products 20, such that the rear-to-front air flow A entering the cell is canalized in such a way as to circulate from the rear to the front by being forced to pass through the products 20 of the assembly 2.

During this operating phase of FIG. 1, the fan 73 of the inflatable sealing device 7A is stopped and the upper duct 70A and the side ducts 71A of this inflatable sealing device 7A are deflated.

In the particular operating phase of FIG. 2, the electronic control means of the cell automatically control the fan 40 of the ventilation means 4 such that a rear-to-front air flow A is circulated in the cell from the rear to the front of the cell, as in the operating phase of FIG. 1, and automatically control the fan 73 so as to draw in air (arrow B) outside the cell and blow it into the auxiliary sealing device 7A through the air admission opening 700a, which makes it possible to inflate the upper duct 70A and the side ducts 71A of this auxiliary sealing device 7A.

With reference to FIG. 2, when the auxiliary sealing device 7A is inflated:

in the inflated state, the upper sealing duct 70A exerts a mechanical pressure on a front part of the upper sealing skirt 60, this mechanical pressure being oriented toward the interior of the cell and in a direction opposite to the upper wall 12 of the cell (downward); this mechanical pressure makes it possible to move the upper sealing skirt 60 away from said upper wall 12 and to keep said front part of the sealing skirt 60 applied against the upper face 2e of the set 2 of products 20 so as to ensure a seal on the top of the set 2 of products 20, including in the absence, if applicable, of the rear-to-front air flow A.

each side sealing duct 71A, in the inflated state, exerts a mechanical pressure on a front part of the corresponding side sealing skirt 50, said mechanical pressure being oriented towards the inside of the cell and in a direction opposite to said side wall 10 or 11 of the cell with respect to which the side sealing skirt 50 is inflatable; this mechanical pressure makes it possible to move the side sealing skirt 50 away from said side wall 10 or 11 of the cell and thus to keep said front part of the sealing skirt 50 applied against the side face 2c or 2d of the set 2 of products 20. A seal is thus maintained on each side of the set 2 of products 20, including in the absence, if applicable, of the rear-to-front air flow A.

Moreover, with reference to FIG. 6, when the sealing device 7A is inflated, the upper sealing duct 70A and each side sealing duct 71A form a sealed corner at their junction and thus advantageously make it possible to ensure a seal in the top corner of cell 1A at the junction between the upper wall 12 and the side wall 10 or 11. Air leaks are thus advantageously also avoided between each upper corner of the cell 1A and the set 2 of products 20.

In another optional operating variant, when a rear-to-front air flow A is circulated from the rear to the front of the cell, one or the other of the sealing skirts 50, 60, and in particular the upper sealing skirt 60, can inflate and come into contact with the set 2 of products 20, not only under the action of this rear-to-front air flow A, but also with the assistance of the corresponding inflatable sealing element of the inflatable sealing device 7A (i.e. with the assistance of the side sealing duct 71A for one or the other side sealing skirt 50 or with the assistance of the upper sealing duct 70A for the upper sealing skirt 60 in the aforementioned example), when the fan 73 is put into operation and the sealing device 7A inflates or is inflated.

Nevertheless, at the end of one or the other of the aforementioned operating phases, the products 20 in the front part of the set 2, which are located between the loading opening of the cell and the contact zones of the sealing skirts 50 and 60 with the set 2 of products 20, may present a lack of homogeneity with regard to temperature and/or moisture content compared with the other products 20 in the set 2.

Figure 3:
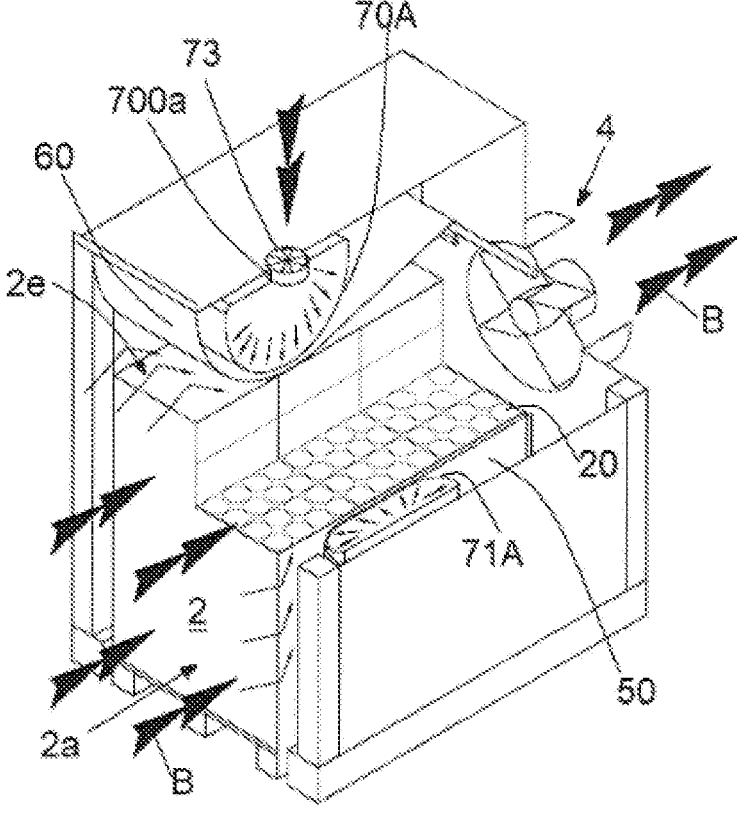
FIG. 3 shows the cell from FIG. 1 when the specific inflatable sealing device of the invention has been inflated and a reverse front-to-rear air flow is circulated through the set of products on the pallet.

To overcome this problem, in another operating phase shown in FIG. 3, the electronic automatic control means of the cell automatically control the ventilation means 4 so as to stop the rear-to-front air flow A and create a reverse air flow B, which flows through the set 2 of products 20 from the front to the rear of the cell and the temperature and/or humidity of which are preferably adjusted as for the rear-to-front air flow A.

This reversal of the direction of circulation of the air flow deflates the upper sealing skirt 60 and the side sealing skirts 50, which skirts 50, 60 are however advantageously kept in contact with the set 2 of products 20 by the inflated ducts 70A and 71A of the auxiliary inflatable sealing device 7A.

At the inlet of the cell 1, this reverse air flow B is canalized so as to pass through at least all the products 20 in the front part of the set 2, which are located between the cell loading opening and the contact zones of the sealing skirts 50 and 60 with the set 2 of products 20.

Where appropriate, this reverse air flow B can make it possible to improve the homogeneity of the temperature and/or the moisture content of the products 20 of the set 2 and can make it possible to reduce the duration of the operating cycles of the cell.

In another embodiment, the auxiliary sealing device 7A can be inflated only during the operating phase during which a front-to-rear air flow B, which does not allow the side sealing skirts 50 and upper sealing skirt 60 to be inflated, is created in the storage cell.

Before unloading the storage cell by removing the set 2 of products 20 and in order to facilitate the unloading of the products 20, the fan 40 is stopped and the fan 73 is stopped, which makes it possible to deflate the inflatable sealing device 7A by means of the free escape of the air contained in the single chamber 70a/71a of this inflatable sealing device 7A via the opening 700a and through the fan 73, when stopped.

Figure 7:
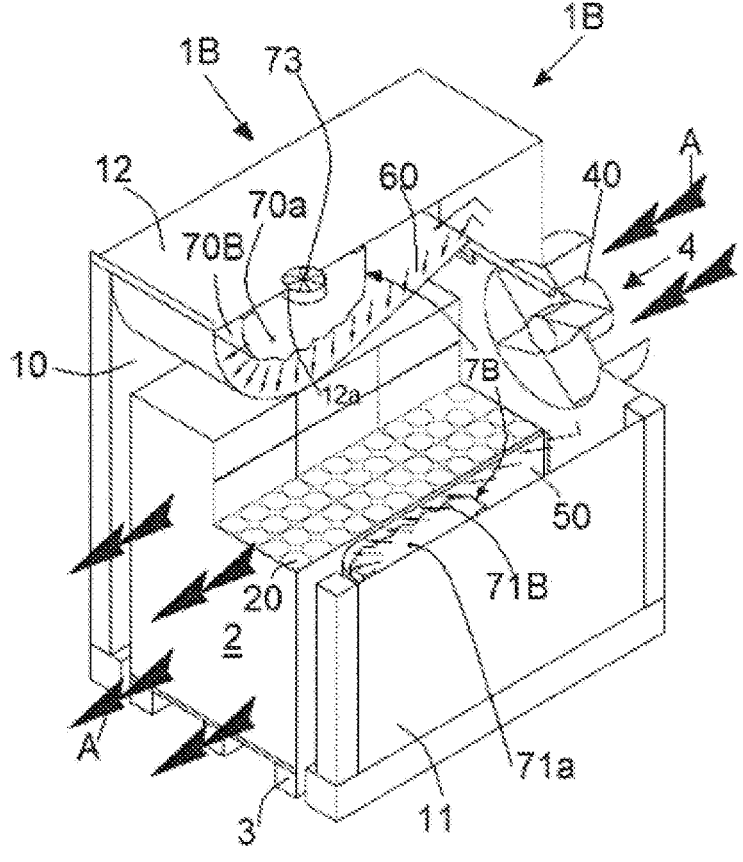
FIG. 7 is an isometric overall view of a second embodiment of a storage cell according to the invention in which a set of products is positioned on a pallet and a rear-to-front air flow that passes through the set of products on the pallet is circulated, and in which the specific inflatable sealing device of the invention is configured according to a second embodiment and is deflated.
Figure 8:
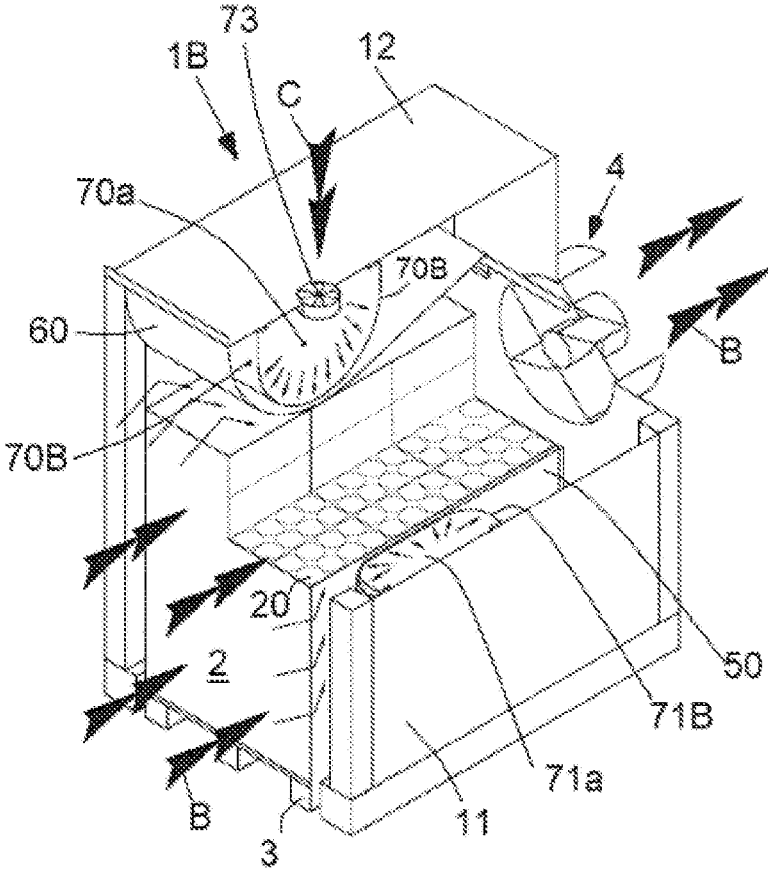
FIG. 8 shows the cell from FIG. 7 when the specific inflatable sealing device of the invention has been inflated and a reverse front-to-rear air flow is circulated through the set of products on the pallet.

FIGS. 7 and 8 show another particular embodiment of a storage cell 1B according to the invention in which a set 2 of products 20 packaged in packaging and arranged on a support 3 of the pallet type is positioned.

This storage cell 1B differs from the cell 1A described above by virtue of the implementation of an inflatable sealing device 7B having a structure that is different from the structure of the inflatable sealing device 7A described above.

In particular, this inflatable sealing device 7B comprises an upper inflatable sealing element 70B and two side inflatable sealing elements 71B (only the one on the right is visible in FIGS. 7 and 8).

The upper inflatable sealing element 70B is, for example, in the form of a strip of flexible and impermeable material which is fixed to the upper wall 12 of the cell and which delimits an internal volume 70a together with this upper wall 12.

Each side inflatable sealing element 71B is, for example, in the form of a strip of flexible and impermeable material which is fixed to the side wall 10 or 11 of the cell and which defines an internal volume 71a together with this side wall 10 or 11.

At each end, the upper inflatable sealing element 71A is detachably or permanently connected to each side inflatable sealing element 71B so that the internal volume 70a communicates in a sealed manner with each internal volume 71a, said inflatable sealing elements 71A and 71B thus delimiting, with said walls 10, 11, and 12 of the cell, a single sealed inflatable chamber 70a/71a, regardless of the presence or absence of a set of products 20 in the cell.

In the particular example shown in the drawings, the fan 73 is fixed to the upper wall 12 of the cell by being positioned through a through-opening 12a (FIG. 2) which is formed in this wall 12 and which opens into the internal volume 70a.

The fan 73 makes it possible, during operation, to draw air from outside the cell and to blow this air (FIG. 8/arrow C) into the single inflatable chamber 70a/71a via this through-opening 12a directly at the outlet of the fan 73, which allows the inflation (FIG. 8) of the upper inflatable sealing element 70B relative to the wall 12 and of each side inflatable sealing element 71B relative to the walls 10 and 11, respectively.

The same operating phases as those previously described for the storage cell 1A can be implemented with the storage cell 1B.

The invention is not limited to the particular embodiment and implementation examples of a storage cell which have previously been described with reference to the appended drawings, and other variant embodiments are also conceivable within the framework of the invention.

Thus, in other variant embodiments, in a non-exhaustive manner:
the inflatable sealing device 7A could have an upper inflatable sealing element 70A or 70B and a single side sealing element 71A or 71B; in this case, the end of the upper inflatable sealing element 70A or 70B which is not extended by a side sealing element 71A or 71B is completely sealed;
the ventilation means 4 can be designed or used so as to only create an air flow (rear-to-front A) that allows the inflation of the sealing tarpaulins 50, 60 or the like (i.e. a reverse air flow B is not implemented) or so as to only create an air flow (front-to-rear B) (i.e. a rear-to-front A air flow A).

In the embodiment in the appended drawings, the inflatable sealing device 7A (or 7B) is associated with the sealing skirts 50 and 60 of the sealing devices 5 and 6 and, when inflated, allows indirect sealing by means of these sealing skirts 50 and 60 interposed between the inflatable sealing elements 70A (or 70B) and 71A (or 71B) and the set 2 of products 20. In another variant, an element interposed between an inflatable sealing element 70A, 70B, 71A, 71B and the set 2 of products 20 is not necessarily inflatable, and more particularly is not necessarily an inflatable sealing skirt 50 or 60. In another variant, the sealing skirts 50 and 60 could be omitted; in this case, in the inflated state, the upper sealing element 70A (or 70B) and the side sealing element or elements 71A (or 71B) of the inflatable sealing device 7A (or 7B) make it possible to achieve direct sealing by coming into direct contact with the set 2 of products 20.

In the embodiment in the appended drawings, the air for inflating the sealing device 7A or 7B is advantageously obtained by means of an air source (fan 73 or air compressor) which is independent of the ventilation means 4. However, in another embodiment, this air for inflating the sealing device 7 can also be obtained by recycling or by diverting part of the reverse air flow B produced by the ventilation means 4 by means of at least one pipe that connects the inflation chamber to the ventilation means 4.

The invention claimed is:
1. A cell for storing a set of products that is arranged on at least one storage support, said cell comprising:
first and second side walls which face each other and are spaced apart from each other and an upper wall that defines, together with the first and second side walls, a housing for the set of products, the housing comprising an opening on a front face for introduction and/or removal of the set of products;
a ventilator suitable for creating a rear-to-front air flow that circulates in the housing from a rear to a front of the housing or for creating a front-to-rear air flow that circulates in the housing from the front to the rear of the housing; and
an inflatable sealing device and an inflation device which allows the inflatable sealing device to be inflated, the inflatable sealing device comprising:
an upper inflatable sealing element and at least one side inflatable sealing element which allow, in an inflated state, a sealing between the upper wall of the cell and at least one part of a top face of the set of products positioned in the cell and a sealing between at least one side wall of the cell and at least one part of one of side faces of the set of products positioned in the cell,
wherein the upper inflatable sealing element and the at least one side inflatable sealing element delimit a single inflatable chamber, and the inflation device allows the upper inflatable sealing element and the at least one side inflatable sealing element to be inflated by blowing air into the single inflatable chamber,
the cell further comprising:
an upper flexible sealing skirt fixed to the upper wall of the cell such that the upper inflatable sealing element of the inflatable sealing device is positioned between the upper wall and the upper flexible sealing skirt, said upper flexible sealing skirt being suitable for inflating with respect to the upper wall of the cell and toward an interior of the housing under an effect of an air pressure which is generated in the housing, in a presence of the set of products in the cell, by means of said air flow created by the ventilator of the cell, or
at least one side flexible sealing skirt fixed to one of the first or second side walls of the inflatable cell such that the at least one side inflatable sealing element is positioned between the one of the first or second side wall and the at least one side flexible sealing skirt, the at least one side flexible sealing skirt being suitable for inflating with respect to said one of the first or second side wall of the cell and toward an interior of the housing under an effect of an air pressure which is generated in the housing, in a presence of the set of products in the cell, by means of said air flow created by the ventilator of the cell; or
both the upper flexible sealing skirt and the at least one side flexible sealing skirt.
2. The cell according to claim 1, wherein the inflatable sealing device comprises first and second side inflatable sealing elements which, together with the upper inflatable sealing element, define said inflatable chamber and which, in the inflated state, make it possible to provide a seal between each of the first and second side walls of the cell and at least one part of each side face of the set of products positioned in the cell.
3. The cell according to claim 1, wherein the inflatable chamber comprises at least one air inlet so that the air blown in via the air inlet allows the upper inflatable sealing element and the at least one side inflatable sealing element to be inflated.

4. The cell according to claim 3, wherein the air inlet is formed in the upper inflatable sealing element or in the at least one side inflatable sealing element.

5. The cell according to claim 3, wherein said air inlet is formed in the upper inflatable sealing element and is positioned substantially centrally with respect to the upper inflatable sealing element.

6. The cell according to claim 1, wherein the inflation device comprises at least one fan or air compressor and said inflatable chamber comprises at least one air inlet which is connected to the fan or to the air compressor so that the air blown into said inflatable chamber through the air inlet, by the fan or the air compressor, allows the upper inflatable sealing element and the at least one side inflatable sealing element to be inflated.

7. The cell according to claim 6, wherein the fan or air compressor of the inflation device is distinct from the ventilator of the cell.

8. The cell according to claim 6, wherein said fan or air compressor makes it possible to draw in air outside the cell and blow air into the inflatable chamber by passing the air through at least one of the first or second side walls or the upper wall of the cell.

9. The cell according to claim 8, wherein said fan or said air compressor is positioned through one of the first or second side walls or the upper wall of the cell and allows air to be blown directly into the inflatable chamber.

10. The cell according to claim 6, wherein said fan or air compressor is integrated in the upper inflatable sealing element or in the at least one side inflatable sealing element of the inflatable sealing device.

11. The cell according to claim 1, wherein the upper inflatable sealing element and each of the at least one side inflatable sealing element are distinct parts which are or can be detachably or permanently joined to each other so as to form a one-piece.

12. The cell according to claim 1, wherein said inflatable sealing device is formed in one piece.

13. The cell according to claim 1, wherein said inflatable sealing device comprises one or more inflatable sealing ducts.

14. The cell according to claim 1, wherein the upper inflatable sealing element comprises an upper inflatable duct which is fixed to the upper wall of the cell, and each of the at least one side inflatable sealing element has a side inflatable duct which is fixed to one of the first or second side walls of the cell and which communicates directly and in a sealed manner with the upper inflatable duct so as to form said inflatable chamber.

15. The cell according to claim 1, wherein the upper inflatable sealing element is fixed to the upper wall of the cell and each of the at least one side inflatable sealing element is fixed to one of the first or second side walls of the cell, such that said inflatable sealing elements delimit, together with said walls of the cell, said inflatable chamber.

16. The cell according to claim 2, comprising the at least one side flexible sealing skirt, which includes first and second side flexible sealing skirts, wherein the first side flexible sealing skirt is fixed to one of the first side wall or the second side wall of the inflatable cell such that the first side inflatable sealing element is positioned between the one of the first side wall or the second side wall and the first side flexible sealing skirt, the first side flexible sealing skirt being suitable for inflating with respect to said one of the first or second side wall of the cell and toward an interior of the housing under an effect of an air pressure which is generated in the housing, in a presence of the set of products in the cell, by means of said air flow created by the ventilator of the cell, wherein the second side flexible sealing skirt is fixed to the other of the first side wall or the second side wall of the inflatable cell such that the second side inflatable sealing element is positioned between the other of first side wall or the second side wall and the second side flexible sealing skirt, the second side flexible sealing skirt being suitable for inflating with respect to said one of the first side wall or the second side wall of the cell and toward an interior of the housing under an effect of an air pressure which is generated in the housing, in a presence of the set of products in the cell, by means of said air flow created by the ventilator of the cell.

17. The cell according to claim 1, comprising a controller configured to for automatically control the ventilator and the inflation device of the inflatable sealing device such that, during at least one operating phase of the cell, the ventilator generates an air flow in the housing which, in a presence of the set of products in the storage cell, allows each flexible sealing skirt to be inflated.

18. The cell according to claim 1, comprising a controller configured to automatically control the ventilator and the inflation device of the inflatable sealing device such that, during at least one operating phase of the cell, the inflatable sealing device is inflated and the ventilator generates an air flow in the housing which does not allow the flexible sealing skirt or skirts to be inflated.

19. The cell according to claim 1, wherein the ventilator is arranged to create non-simultaneously a rear-to-front air flow that circulates from the rear to the front of the housing and a front-to-rear air flow that circulates from the front to the rear of the housing, or vice versa.

20. A method comprising:
using the cell according to claim 1 for adjusting a temperature and/or a moisture content of the set of products.

21. A method comprising:
positioning in the housing of the cell according to claim 1 the at least one storage support, the at least one storage support storing the set of products;
adjusting a temperature and/or moisture content of the set of products by inflating the inflatable sealing device so as to create;
a seal between the upper wall of the cell and at least one part of the top face of the set of products positioned in the cell and a seal between at least one of the first or second side walls of the cell and at least one part of one of the side faces of the set of products positioned in the cell; and
the rear-to-front air flow that circulates through the set of products from the rear to the front of the storage cell or the front-to-rear air flow that circulates through the set of products from the front to the rear of the storage cell.

22. The method according to claim 21, wherein the products are non-food products or food products.

* * * * *